United States Patent [19]

Mills

[11] Patent Number: 5,044,236
[45] Date of Patent: Sep. 3, 1991

[54] NESTING VISE

[75] Inventor: Dennis L. Mills, Chaska, Minn.

[73] Assignee: Continental Machines, Inc., Savage, Minn.

[21] Appl. No.: 461,279

[22] Filed: Jan. 5, 1990

[51] Int. Cl.$^5$ .......................... B23D 55/04; B25B 1/24
[52] U.S. Cl. ......................................... 83/29; 83/452; 83/794; 269/132; 269/131
[58] Field of Search .......................... 83/794, 796–799, 83/451, 29, 452, 457; 269/130–132, 108

[56] References Cited

U.S. PATENT DOCUMENTS

| 787,183 | 4/1905 | Irving | 269/132 X |
|---|---|---|---|
| 3,566,731 | 3/1971 | Ensley | 83/799 |
| 3,584,860 | 6/1971 | Ervin | 269/131 |
| 3,675,303 | 7/1972 | McKinnon | 269/131 X |
| 4,072,303 | 2/1978 | Szabo | 269/131 |
| 4,339,116 | 7/1982 | Benz et al. | 269/132 |

Primary Examiner—Steven C. Bishop
Attorney, Agent, or Firm—Dean A. Monco

[57] ABSTRACT

A nesting vise for holding bundles of stock comprising a base with a fixed jaw and a movable jaw mounted thereon, both jaws having faces with apertures therein. A strap is provided which extends between the two jaws through the apertures. A lock is provided to hold the strap on one end, and a strap tightener is attached to the other end of the strap which tightens and holds the bundle of stock, resulting in even radial pull towards the center of the vise so as to locate all of the pieces of stock in the bundle and locking them together.

12 Claims, 4 Drawing Sheets

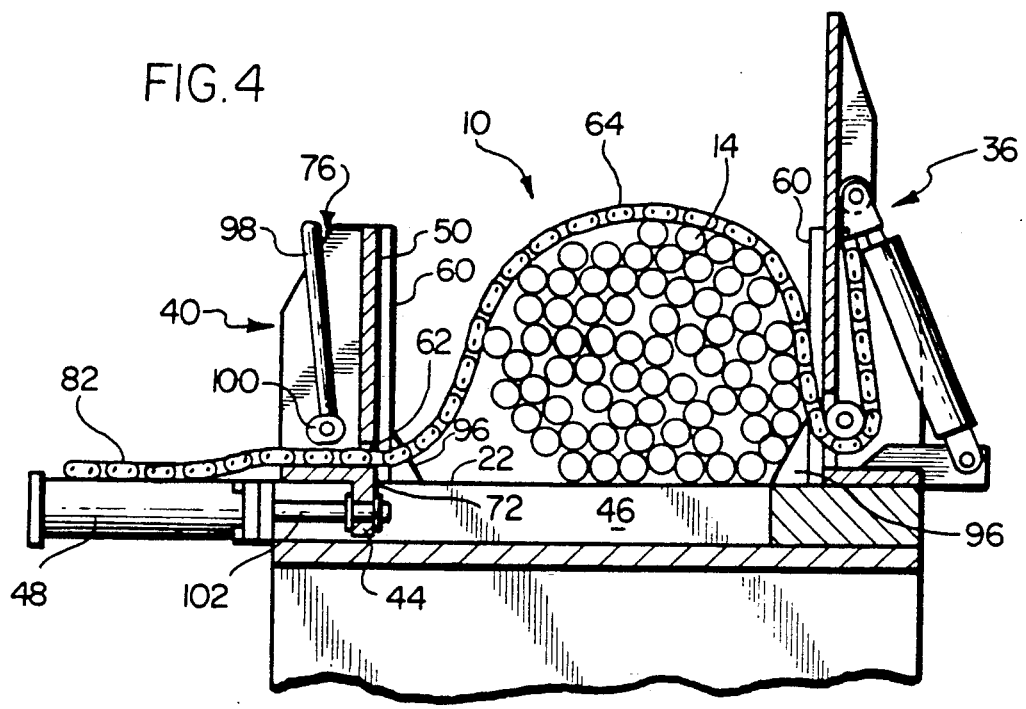
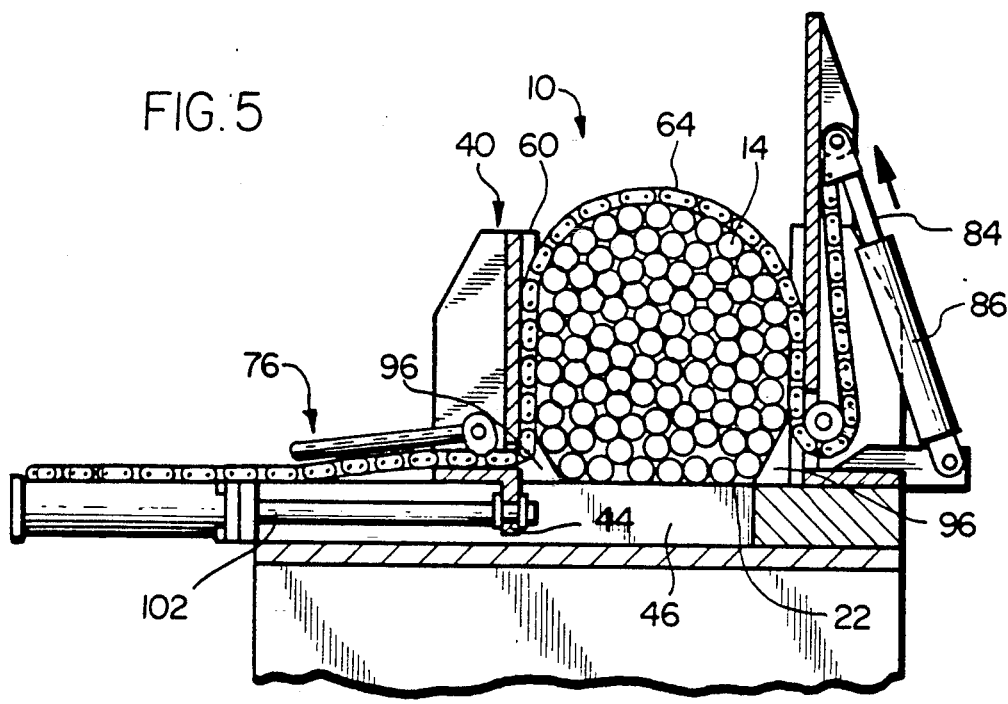

NESTING VISE

FIELD OF THE INVENTION

This invention generally relates to the field of vises, and, more specifically, to a nesting vise for holding stock in bundles during cutting procedures.

BACKGROUND OF THE INVENTION

In industrial material processing, it is common to have large bundles of stock on which various operations are to be performed. For example, sawing is often most conveniently performed on more than one piece of stock at a time, to save costs in labor and utilization of machinery. This is especially true in the area of sawing round bar stock.

Multiple pieces of round bar stock or tubes must be carefully secured to a table by a vise before they can be sawed. If the round bar stock is not carefully secured, a loose piece may spin in the bundle when it comes in contact with a moving saw blade, especially a moving band saw blade. When these "spinners" come in contact with a moving band saw blade, saw teeth break out of the blade and/or the blade itself may break shortening the life of the saw blade and causing down time for blade replacement.

Current vises employed to hold round bar stock for sawing use an additional clamp or vise which mounts between the tops of the two jaws of a vise and exerts downward pressure on the stock, thus forming a square or rectangular nest for the stock. Round bar stock must be evenly and carefully stacked in this type of vise, e.g., there generally must be the same number of pieces of round bar stock in each row, or in every other row, in order to effectively secure the bar stock. Stacking bar stock in this fashion is time consuming and labor intensive, thus slowing down overall productivity. Even with careful stacking, a spinner may sometimes occur in vises of this type.

Therefore, it is an object of this invention to overcome the above difficulties.

It is a further object of the present invention to provide a nesting vise capable of securely holding bar stock for cutting without the need for symmetrically stacking the bar stock prior to cutting.

It is a further object of this invention to provide a nesting vise which is relatively easy to operate.

It is a further object of this invention to provide a nesting vise which may be used for indexing.

It is an object that this invention to provide a nesting vise which may be removed from the work area when not in use.

SUMMARY OF THE INVENTION

The present invention pertains to a nesting vise for holding bundles of stock, which may, for example, be round bar stock or tubes, and comprising a table with a fixed jaw and a movable jaw mounted thereon, with the jaws having opposing faces and an aperture in each face. A strap for securing the stock in a bundle extends between the two jaws through the apertures. A lock holds the strap on one jaw. A strap tightener is mounted on the other jaw and attaches to the other end of the strap. Tightening the strap will produce an even radial pull on the stock towards the center of the vise, locating all of the stock in the bundle within the nesting vise and locking the stock together.

BRIEF DESCRIPTION OF THE DRAWINGS

The invention, together with its objects and advantages thereof, may best be understood by reference to the following detailed description taken in conjunction with the accompanying drawings of which:

FIG. 4 is a cut away side view of a vise built according to the present invention taken along line 4—4 of FIG. 2, after round bar stock has been loaded; and FIG. 5 is a cut away side view of the vise of FIG. 4 after engagement of the strap around the round bar stock.

DETAILED DESCRIPTION OF THE PREFERRED EMBODIMENT

Figure 1:
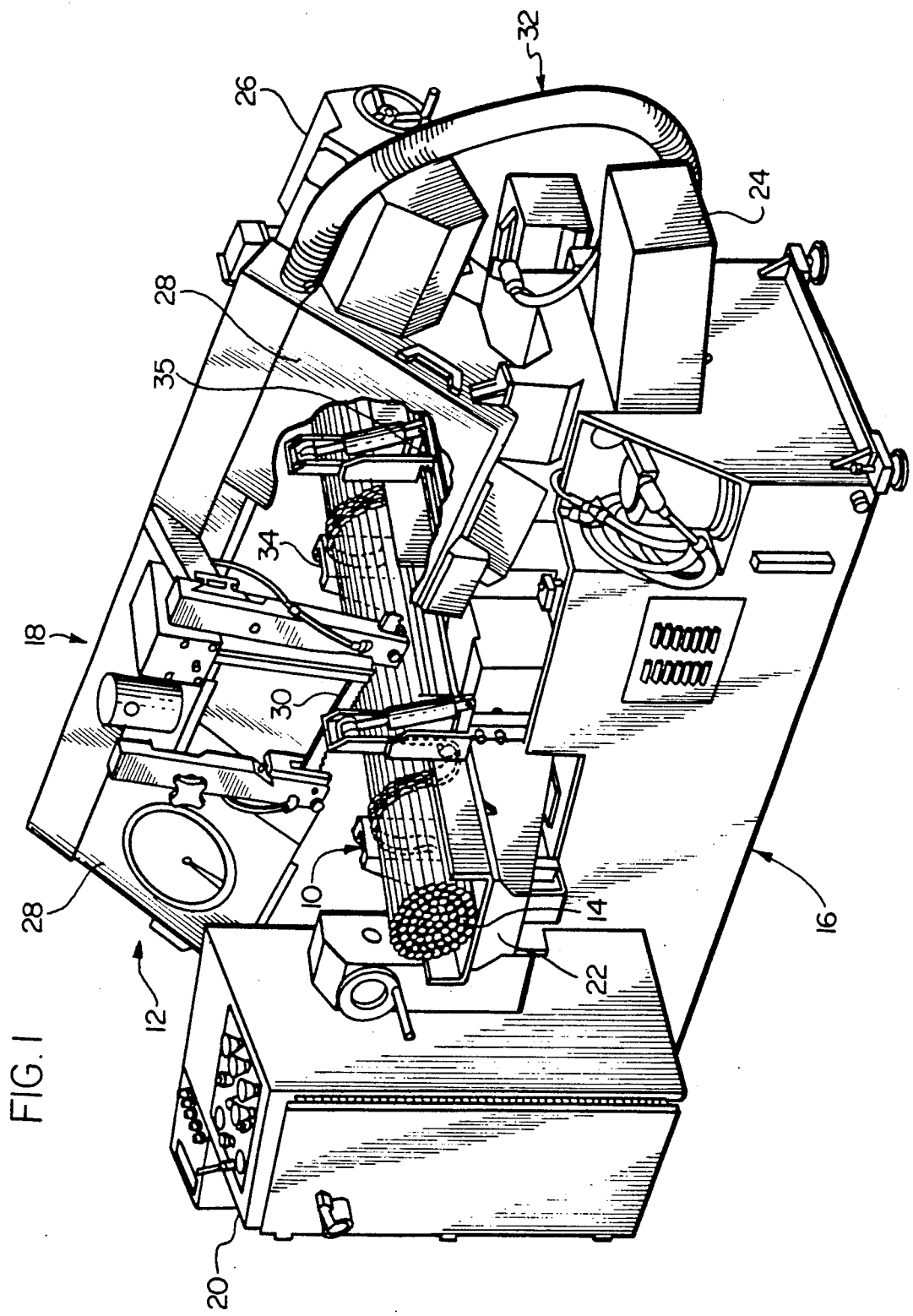
FIG. 1 is a perspective view of a band saw with two vises built according to the present invention, with the band saw partially cut away to show detail.

FIG. 1 shows a nesting vise 10 according to the preferred embodiment of this invention, mounted on an automated band saw, shown generally at 12. In this illustration of this invention, the nesting vise 10 is shown holding a bundle of round bar stock 14. This invention will be described in connection with securing round bar stock because round bar stock is the most difficult type of stock to hold securely during a sawing operation; however, other types and shapes of stock may be held by the nesting vise of this invention.

As is known in the art, an automated band saw such as the one shown at 12 generally comprises a base 16 on which a saw head 18 is movably mounted, and automated controls 20 for controlling the band saw operations. The base 16 includes a vise table 22 for securing material to be sawed, a chip conveyor 24 to remove waste chips from the sawing operation and a hydraulically operated saw head lifter (not shown in this Figure). The saw head 18 includes a variable speed motor 26 which drives a drive wheel contained within housing 28. A band saw blade 30, as is known in the art, is operably run around the drive wheel and an idler wheel (also contained in housing 28). Flexible hose 32 contains electrical and hydraulic lines used in the operation of the band saw 12 and are connected between the controls 20 and the saw head 18.

In operation, the saw head 18 is raised and the material to be cut is placed on the vise table 22. The material is secured by one or more vises, similar to those shown at 10. Next, the saw is turned on at the controls 20 and the saw blade 30 moves. When the saw blade 30 reaches operating speed, the operator lowers the saw head 18 by the controls 20 so that the saw blade 30 engages the material and begins to cut. The saw head 18 is slowly advanced until the material is cut off. The saw head 18 is then raised and the material is removed. Optionally, an indexing table, as known in the art, may index a further piece of the material into position to be sawed, thus providing precision, uniform lengths of material after cutting.

The band saw 12 of this illustrated embodiment may be a twelve-inch square tilt frame band saw, such as model number C-260A manufactured by the DoALL Corporation of 254 North Laurel Avenue, Des Plaines, Ill. 60016. A larger capacity band saw on which this nesting vise has been used is a DoALL C-2525M automatic power saw. Other saws from other manufacturers and types of saws for example, circular saws, may be used with the preferred embodiment of the invention, depending on the type of stock, and the operation to be performed.

A further feature of this invention is illustrated in FIG. 1. FIG. 1 shows a band saw with two nesting vises 10, 34 according to a preferred embodiment of this invention. Nesting vise 34 may be on an indexing table 35. When two nesting vises 10, 34 are used in an indexing arrangement, the indexing vise 34 remains locked around the bar stock 14, and the fixed vise 10 is loosened between the indexing operations so that the stock 14 may be advanced across the vise table 22. The fixed vise 10 is then retightened according to the description hereinbelow.

Figure 2:
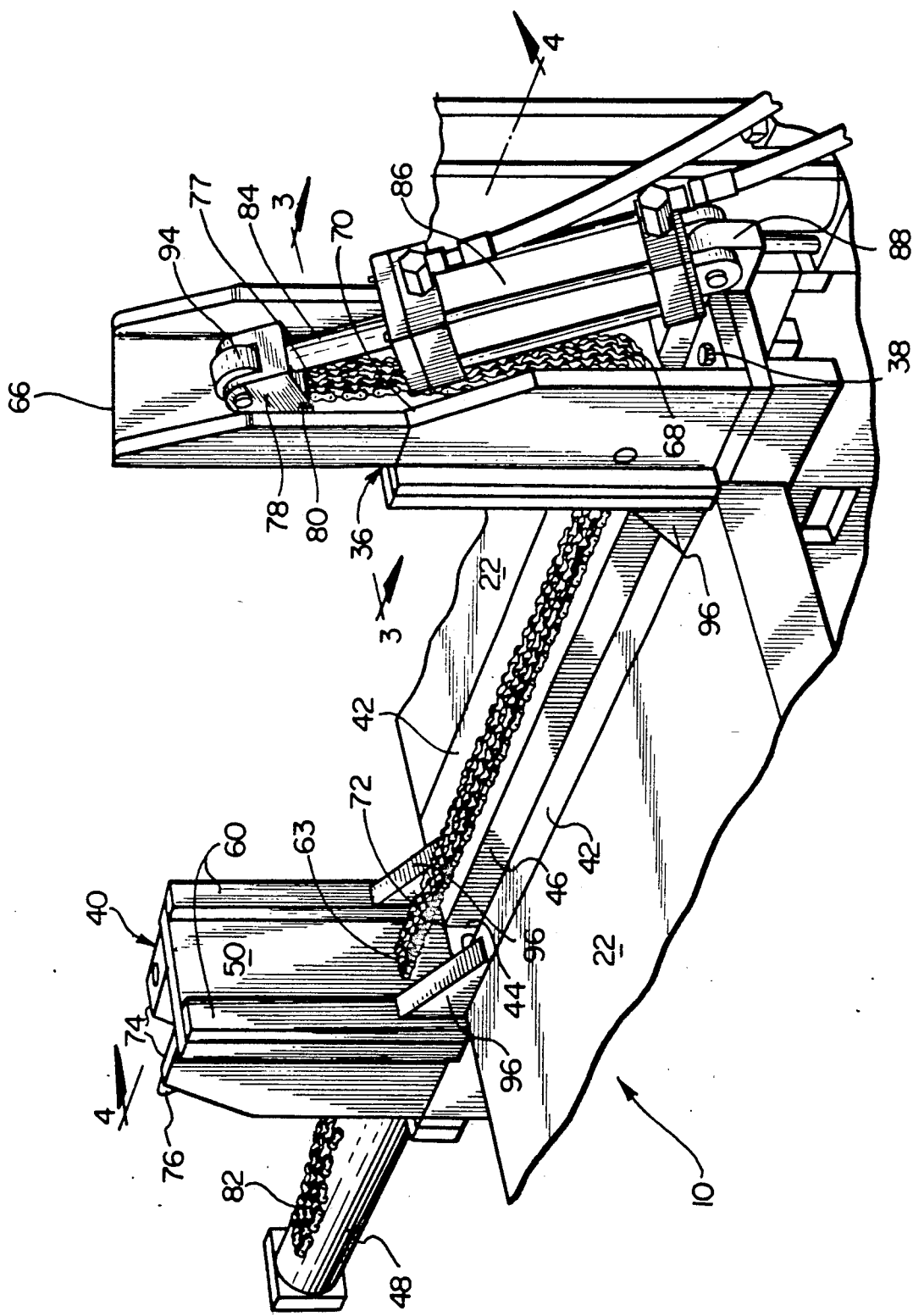
FIG. 2 is an enlarged perspective view of a vise built according to this invention, showing the major components thereof.

Turning now to FIG. 2, an enlarged perspective view of the preferred embodiment of this invention is shown generally at 10. The nesting vise 10 of the preferred embodiment of this invention includes a vise table or base 22 mounted on the saw base 16. The vise table 22 may be generally part of the band saw base 16, planed flat and used in conjunction with all sawing operations or may be a separate attached piece, as known in the art. A fixed vise jaw 36 is removably mounted on one side of the vise table 22. To this end, bolts 38 are provided which extend through the bottom of the fixed vises jaw 36 and through the vise table 22, and secured by a nut as known in the art. The fixed vise jaw 36 is preferably removable because the extra height and/or aperture, as will be described hereinbelow, may not be desirable in all of the operations of the band saw 12. If desired, the fixed jaw 36 of the nesting vise 10 may be permanently mounted, by means of welding, for example.

A movable jaw 40 is mounted opposite to the fixed jaw 36. The movable jaw 40 moves towards and away from the fixed jaw 36 in order to secure material to be cut between the two jaws, as is known in the art. The movable jaw 40 slides along bearing plates 42, and includes a tab 44 which fits into and slides in an opening 46 in the table 22. The tab 44 is connected by means known in the art to a ram of a hydraulic piston which is contained in housing 48. The hydraulic piston is under the control of the automated controls 20 of the band saw 12, as is known in the art. The movable jaw 40 may be moved by means known in the art, such as a screw.

The movable vise jaw 40 of this embodiment of this invention includes a jaw base 72 which includes the tab 44 and is slidably engaged in opening 46. Two buttresses 74 are formed on the jaw base 72 on either side of the jaw base 72. A face plate 50 is formed with or attached to the buttresses 74 in such a manner that the face plate 50 is supported by the buttresses 74 and the jaw base 72, and may engage and hold stock 14 in the nesting vise 10. A camlock 76 (FIG. 5) is movably mounted between the buttresses behind the face plate 50, according to one aspect of this invention, as will be described further, below.

Figure 3:
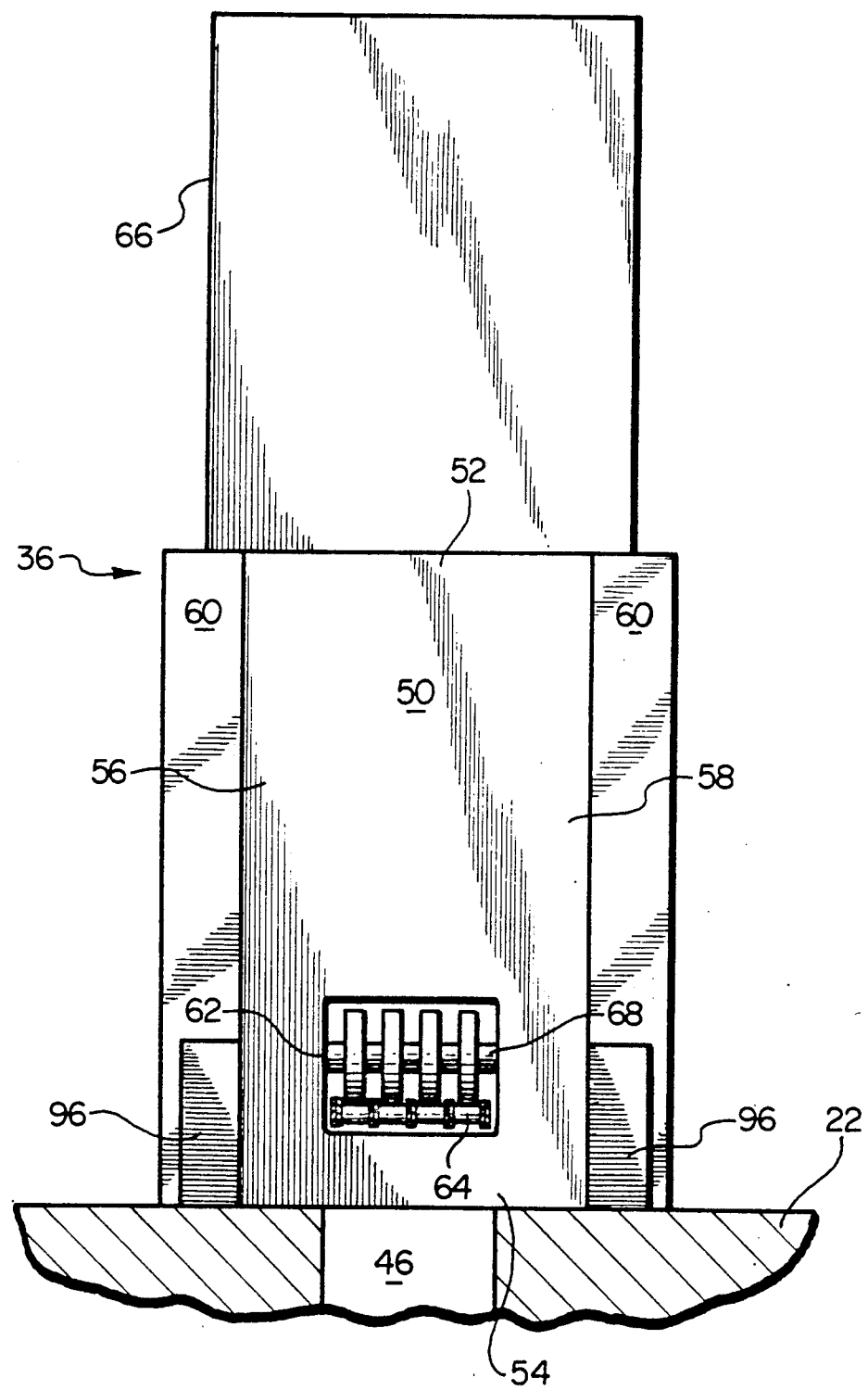
FIG. 3 is a front view of a fixed jaw of a nesting vise built according to the present invention taken along line 3—3 of FIG. 2.

Turning now to FIG. 3, a front view of the fixed vise jaw 36 is shown. The common features of the vise jaws in general will be described in connection with FIG. 3, so that, except where stated, the description applies to both jaws. A face plate 50, as shown in FIG. 3, includes an upper edge 52, a lower edge 54, a left edge 56 and a right edge 58. Wear plates 60, as are known in the art, may be removably mounted on both the left edge 56 and the right edge 58 of the face plate 50 in a vertical orientation. Wear plates 60 generally bear the majority of force applied by the nesting vise 10 to the stock and thus protect the face plate 50 and extend the useful life of the vise jaws.

The face plates 50 of this invention of both the fixed jaw 36 and the movable jaw 40 includes an aperture 62 located toward the lower edge 54 of the face plate 50, approximately midway between the left edge 56 and the right edge 58. The aperture 62 extends through the face plates, permitting passage of a strap 64 through the face plates 50, according to the preferred embodiment of this invention.

In addition to the common feature described above, returning to FIG. 2, the fixed jaw 36 of this embodiment includes a channel 66 adjacent and fixedly attached to the top edge 56 of the fixed jaw 36. The channel 66 comprises, in the preferred embodiment, steel and is used as a support for gaining leverage in tightening the strap 64, as will be described hereinbelow. A roller 68 is mounted between two buttresses 70 of the fixed vise jaw 36 on an axle which serves as an idler wheel in tightening a strap.

The movable vise jaw 44 of this embodiment of this invention includes a jaw base 72 which includes the tab 44 and is slidably engaged in opening 46. Two buttresses 74 are formed on the jaw base 72 on either side of the jaw base 72. The face plate 50 is formed with or attached to the buttresses 74 in such a manner that the face plate 50 is supported by the buttresses 74 and the jaw base 72, and may engage and hold stock 14 in the nesting vise 10. A camlock 76 (FIG. 5) is movably mounted between the buttresses behind the face plate 50, according to one aspect of this invention, as will be described further, below.

A strap 64 is used in order to provide even radial pull towards the center of the nesting vise 10 and thus locate and lock the stock 14 to be held. The strap 64 may be a chain, specifically type A leaf chain with a ¾ inch pitch. In other embodiments of this invention, other types of chains may be used depending upon the application. Other materials besides chain could also be used for the strap; for example, woven metal webbing or synthetic or natural cloth webbing. A cloth webbing may be used to clamp wooden dowels for cutting. A strap 64 made of Kelvar TM (a trademark of the Dupont Corp.), a plastic, may be desirable to prevent marring of the material being cut.

In this embodiment of this invention the strap 64 includes a first end 77 which is attached to a clevis mount 78 by means of a pin 80, as known in the prior art. The strap 64 passes around the roller 68 and through the aperture 62 in the fixed vise jaw 36. The length of the strap should be appropriate to the maximum size of the bundle. In the preferred embodiment the strap is approximately eight (8) feet long (on C2525 model saw). A second end 82 of the strap passes through the aperture 62 in the movable jaw 40 and under the camlock 76, as will be described in more detail hereinbelow.

The clevis mount 78 is, in the preferred embodiment, attached to a ram 84 of a hydraulic cylinder 86. The hydraulic cylinder 86 is movably mounted at 88 by means of a pin, onto the fixed jaw 36 of the nesting vise 10 of the preferred embodiment of this invention Hydraulic pressure is developed in the hydraulic cylinder by hydraulic fluid being delivered from the automatic controls 70 through hoses 90 into fittings 92, as known in the art. The hydraulic cylinder 86 tightens the strap 64 of the nesting vise as will be described hereinafter below in connection with FIGS. 4 and 5. Attached to the clevis mount 78 is a wheel 94 which rides on the channel 66 of the fixed jaw 36, to aid in gaining leverage to tighten the strap 64.

Also included in the nesting vise 10 according to the preferred embodiment of this invention are a plurality of wedges 96. In this embodiment of this invention there are two wedges 96 aligned with the wear plates 60 removably mounted on the face of the fixed jaw 36 and the movable jaw 40. The wedges 96 aid in forcing the bundle of stock 14 into close alignment (as will be described in more detail below) when the nesting vise 10 of this invention is engaged.

Turning now to FIGS. 4 and 5, the operation of the nesting vise will be described. FIG. 4 is a cut away view taken along lines 4—4 of FIG. 2, showing the nesting vise 10 after it has been loaded with round bar stock 14, but before it has been locked and tightened. In the art, it is common that the round bar stock 14 is loosely bound using metal bands, and loaded onto the vise table 22 by means of a crane (not shown in this illustration). After the bar stock 14 is loaded onto the table 22, the second end 82 of strap 64 is passed over the top of the stock 14 and fed through the aperture 62 in the face plate 50 of the movable jaw 40. The strap is passed under the camlock 76. Camlock 76 comprises a camlock lever 98 and an eccentric lock 100.

Other methods of locking the strap 64 may be used with this invention without departing from the spirit of this invention in the scope of the claim. For example, a hydraulic clamp as is known in the art may be used in place of the camlock 76, by hydraulically engaging the cam, for example. This would make the nesting vise 10 of this invention fully automatic.

After the strap 64 is engaged in the camlock 76, the movable jaw 40 is advanced towards the bar stock 14 hydraulically via piston 102 under the control of automated controls 20, as is known in the art, which moves the tab 44 and therefore the base 72 of the movable jaw 40 through opening 46.

Turning now to FIG. 5, a cut away view of the nesting vise 10 taken along lines 4—4 of FIG. 2, is shown fully engaged and tightened around bar stock 14. Movable jaw 40 is pushed forward by way of hydraulic rod 102 until the wedges 96 engage and urge the bar stock 14 upward. Camlock 76 is unlocked and the slack is pulled out of the strap 64 by the operator and the camlock 76 is reengaged. This operation is repeated until the slack is removed from the strap 64. Slack may be removed from the strap 64 while the vice jaws are exerting force on the bundle of stock 14 in the preferred embodiment. To this end, the vice jaw wear plates 60 are selected so that they are thicker than the strap 64. As a result, there is sufficient clearance between the bundle of stock 14 and the face plates 50 for the strap 64 to move relatively freely, and this may be easily tightened manually.

Hydraulic fluid pressure is then applied through the fluid hoses 90 to the hydraulic cylinder 86, causing an outward motion of ram 84 as indicated by the arrow. As the ram 84 moves outwardly, the clevis mount 78 is moved upwardly thus tightening the strap 64, and the wheel 94 advances upwardly along the inside of the channel 66 of fixed jaw 36. The force applied by the strap 64 forces the stock 14 together and towards the bottom of the vise table 22. The movable jaw 40 is then advanced again, as described above, if necessary. The result is an even radial pull towards the center of the nesting vise 10, locating all the rods in the stock 14 and locking them together. The saw 12 is then engaged and the bar stock 14 can be cut while being free from spinners and the problems which are caused thereby.

The scope of the invention herein shown and described is only to be considered as illustrative. It will be apparent to those skilled in the art that numerous modifications may be made therein without departing from the spirit of the invention and the scope of the appended claims.

I claim:

1. A vise apparatus for nesting bundles of individual pieces of stock to be cut by a sawing means, said vise comprising:
   a base;
   a fixed jaw fixedly mounted on said base, said fixed jaw having a first face with a first aperture therein;
   a movable jaw movably mounted on said base and capable of repeated movement toward and away from said jaw during the nesting procedure, said movable jaw having a second face with a second aperture therein, and positioned on said base so that the first face of said fixed jaw is generally opposed to the second face of said movable jaw;
   a strap means extending between said fixed jaw and said movable jaw through said first and second apertures, said strap means being used for securely nesting said bundles of stock, and having a first end, a second end and a length;
   locking means capable of securably engaging or disengaging said length of said strap means repeatedly during the nesting procedure prior to the cutting operation; and
   strap tightening means capable of repeatedly engaging or disengaging said first end of said strap during the nesting procedure prior to the cutting operation and effecting tightening or loosening of said strap means around said bundle of stock, so as to nest individual pieces of said bundle of stock between said strap means and said base and between said fixed and movable jaws.

2. The vise apparatus of claim 1 including wedges attachable to said first and second faces, extending from said face along said base toward the opposing face.

3. The vise apparatus of claim 1 wherein said strap means comprises a chain.

4. The vise apparatus of claim 3 wherein said strap means comprises a leaf chain.

5. The vise apparatus of claim 3 wherein said strap means comprises wire cloth.

6. The vise apparatus of claim 1 wherein said strap means comprises cloth webbing.

7. The vise apparatus of claim 1 wherein said strap means comprises plastic.

8. The vise apparatus of claim 1 wherein said locking means comprises a cam and lever lock.

9. The vise apparatus of claim 1 wherein said strap tightening means comprises a hydraulic cylinder.

10. The vise apparatus of claim 1 wherein said first and second faces include replaceable wear plates extending vertically on said face plates and further that said wear plates are thicker than said strap means.

11. A combination band saw and vise apparatus for nesting individual pieces of bundles of stock to be cut by a sawing means, said combination comprising;

a saw including a base, said saw being movably mounted on said base;

a fixed jaw fixedly mounted on said base, said fixed jaw having a first face with a first aperture therein;

a movable jaw movably mounted on said base and capable of repeated movement toward and away from said fixed jaw during the nesting procedure, said movable jaw having a second face with a second aperture therein and positioned on said base so that said first face of a said fixed jaw is generally opposed to said second face of said movable jaws;

a strap means extending between said fixed jaw and said movable jaw through said first and second apertures, said strap means being used for securely holding said bundles of stock and having a first end, a second end and a length;

locking means capable of securably engaging or disengaging said length of said strap means repeatedly during the nesting procedure prior to the cutting operation; and strap tightening means capable of repeatedly engaging or disengaging said first end of said first end of said strap means around said bundle of stock during the nesting procedure, so as to nest said individual pieces of said bundle of stock between said strap means and said base and between said fixed and movable jaws.

12. A method for nesting and holding bar stock prior to being cut by a saw comprising;

placing a bundle of individual bar stock pieces between a movable vise jaw and a stationary vise jaw;

moving the movable jaw as necessary toward and away from the fixed jaw to move the bar stock pieces more closely together;

nesting the bar stock pieces together using a strap means extending between a first face on said stationary jaw and a second face on said movable jaw;

repeatedly tightening and untightening said strap means until the bar stock pieces remain essentially stationary during the cutting operation;

locking the strap means and the movable vise jaw using locking means to maintain the stationary position of said bar stock pieces during the cutting operation; and cutting the bar stock into desired lengths.

* * * * *